(12) United States Patent
Park (10) Patent No.: US 10,330,147 B1
(45) Date of Patent: *Jun. 25, 2019

(54) SLEEVE BEARING FOR TURBOCHARGING DEVICE

(71) Applicant: Bret J. Park, South Jordan, UT (US)

(72) Inventor: Bret J. Park, South Jordan, UT (US)

(73) Assignee: Bret J. Park, South Jordan, UT (US)

( * ) Notice: Subject to any disclaimer, the term of this patent is extended or adjusted under 35 U.S.C. 154(b) by 239 days.

This patent is subject to a terminal disclaimer.

(21) Appl. No.: 15/624,656

(22) Filed: Jun. 15, 2017

Related U.S. Application Data

(63) Continuation of application No. 14/028,031, filed on Sep. 16, 2013, now Pat. No. 9,683,600.

(51) Int. Cl.
| | | |
|---|---|---|
| *F16C 19/54* | (2006.01) | |
| *F02C 7/06* | (2006.01) | |
| *F01D 25/16* | (2006.01) | |
| *F16C 37/00* | (2006.01) | |
| *F16C 35/077* | (2006.01) | |
| *F16C 33/66* | (2006.01) | |
| *F16C 19/16* | (2006.01) | |
| *F16C 27/04* | (2006.01) | |

(52) U.S. Cl.
CPC ........ *F16C 19/548* (2013.01); *F16C 33/6659* (2013.01); *F16C 35/077* (2013.01); *F16C 37/007* (2013.01); *F16C 19/163* (2013.01); *F16C 27/045* (2013.01); *F16C 2360/24* (2013.01)

(58) Field of Classification Search
CPC .... F02C 6/12; F02C 7/06; F01D 25/16; F01D 25/162; F01D 25/24; F01D 25/243; F05B 2220/40; F05D 2220/40; F16C 19/548; F16C 19/163; F16C 33/6659; F16C 35/077; F16C 27/045; F16C 2360/24; F16C 37/007
See application file for complete search history.

(56) References Cited

U.S. PATENT DOCUMENTS

| | | | | |
|---|---|---|---|---|
| 3,574,424 A | * | 4/1971 | Hagemeister | ........... F16C 25/08 384/517 |
| 3,890,780 A | * | 6/1975 | Hagemeister | ........... F01D 25/16 184/6.11 |
| 4,370,106 A | * | 1/1983 | Lauterbach | ............. F01D 25/16 384/126 |
| 4,641,977 A | * | 2/1987 | Woollenweber | ........ F16C 21/00 384/101 |

(Continued)

*Primary Examiner* — Jason D Shanske
*Assistant Examiner* — Joshua R Beebe
(74) *Attorney, Agent, or Firm* — Austin Rapp (57) ABSTRACT

A ball bearing sleeve is used in a turbocharging device. The ball bearing sleeve has one or more ball bearings that are designed to control loads that are applied to the sleeve in the x, y and z-directions. The ball bearing sleeve is designed to replace the "thrust bearing" that is typically the "weak link" in a turbocharging device, as well as the journal bearings. The sleeve is designed to include a cylindrical portion that includes one or more grooves for directing the flow of oil around the sleeve for cooling. An oil duct having access holes directs the flow of oil into the ball bearings. Sleeve device may be retro-fitted into an existing turbocharger, which originally had journal and thrust bearings.

16 Claims, 4 Drawing Sheets

(56) References Cited

U.S. PATENT DOCUMENTS

| | | | | |
|---|---|---|---|---|
| 4,676,667 | A * | 6/1987 | Komatsu | F01D 25/16 384/517 |
| 6,877,901 | B2 * | 4/2005 | Wollenweber | F01D 25/164 384/535 |
| 9,683,600 | B2 | 6/2017 | Park | |
| 2012/0219245 | A1 * | 8/2012 | McKeirnan, Jr. | F16C 19/163 384/473 |
| 2013/0202432 | A1 * | 8/2013 | House | F01D 25/16 415/229 |

* cited by examiner

SLEEVE BEARING FOR TURBOCHARGING DEVICE

CROSS-REFERENCE TO RELATED APPLICATIONS

This application claims priority to and is a continuation application of U.S. application Ser. No. 14/028,031 which was filed on Sep. 16, 2013, and is entitled SLEEVE BEARING FOR TURBOCHARGING DEVICE. The foregoing document(s) are incorporated by reference as though set forth herein in their entirety.

TECHNICAL FIELD

The present embodiments bearings used in a turbocharging system. More particularly, the present embodiments relate to a new type of sleeve that will replace the conventional "thrust bearing" and "journal bearings" used in a turbocharging device.

BACKGROUND

In piston engines, intake gases are pulled into the cylinder by the downward stroke of the piston (which creates a low-pressure area). The amount of air which is actually pulled into the engine is often the limiting factor in the performance of the engine. In the past, to overcome the limitations of inadequate air supply, engines are equipped with turbochargers The need to optimize the horsepower, efficiency, speed and acceleration of engines has motivated the development of many different turbocharger devices, including those known as turbochargers and others known in the field as superchargers. Both turbochargers and superchargers produce a boost in airflow and air pressure to the engine's combustion chamber(s), which results in a desired, although delayed, increase in horsepower, efficiency, speed and acceleration.

A turbocharger is known in the field to produce that boost in airflow by utilizing the flow of exhaust gases from the engine which, by various means, ultimately power (rotate) an impeller, which herein means a fan-like air pump/air compressor apparatus, in the turbocharger, which draws in outside air (at atmospheric pressure), and that may push and compress that air to higher than atmospheric pressure, and forces that outside air to the combustion chamber of an engine (including the engine's intake manifold). This increased airflow results in increased engine output (RPMS, acceleration, efficiency and horsepower). Thus, a turbocharger is exhaust gas driven, and not mechanically driven.

A supercharger is known in the field to produce a similar boost in airflow by mechanically utilizing power tapped from the engine by means of operably coupling to the engine to receive rotational motion, usually by means of a pulley or other similar device, which is connected to one of the pulleys, belts or belt systems at, or near, the front of the engine (these pulleys, belts, etc., being a transmission device, transferring power from the engine to the supercharger) to power (rotate) an impeller, twin-screw or other type of air pump, air-compressing device, which draws in outside air and forces or compresses that outside air to the engine's combustion chamber(s), with a similar result of increasing engine output (RPMS, acceleration, efficiency and power). Thus, a supercharger is mechanically driven, not exhaust driven.

A turbocharger may compress air that is supplied to the combustion chambers of an engine. In particular, a turbocharger may supply air at a higher pressure and higher density than would otherwise be possible. Thus, the objective of a turbocharger is to improve an engine's volumetric efficiency by increasing the density of the intake air. Stated another way, turbochargers allows engines to squeeze more air into a cylinder, which means that more fuel can also be added to the cylinder. Therefore, more power is produced from each explosion in each cylinder.

Most modern turbochargers include a turbine driven compressor. Typically, a turbocharger is bolted to the exhaust manifold. The exhaust from the cylinders spins the turbine. In particular, the exhaust spins the turbine as it passes through the blades of the turbine. The more exhaust that passes through the blades, the faster the turbine spins.

The turbine is connected by a shaft to a compressor, which is located between the air filter and the intake manifold. The compressor pressurizes the air going into the piston cylinders. The compressor is typically a type of centrifugal pump that draws air in at the center of its blades and flings it outwards as it spins.

The shaft that connects the turbine to the compressor will generally be surrounded by a thrust bearing and two (2) journal bearings. The purpose of these bearings is to control the x, y, and z motion of the shaft. However, the thrust bearing is the "weak link" in the turbocharger system. In fact, many thrust bearings have been known to "fail" (e.g., just continuously spin), thereby reducing and/or eliminating the effectiveness of the turbocharger.

For example, as the compressor wheel spins, a "boost pressure" is formed from the compressed air. As boost pressure develops, the pressure is exerted on the back side (the non-airfoil side) of the compressor wheel, causing a forward (axial) thrust. For example at 40 psi, on a 2.5 inch exducer compressor wheel, the forward thrust would be approximately 197 lbs of axial thrust. In turn, the compressor wheel acts likes an airplane propeller and tries to climb forward through the air, which increases the axial thrust. Moreover, in the event of surge (e.g., a situation where the compressor wheel changes direction of spinning due to air going backwards through the intake), the thrust load will be violently changed back and forth, also causing huge thrust loads.

It is these thrust loads (e.g., caused by the event of surge or the general thrust load caused by the axial thrust) that may ultimately cause the thrust bearing to fail. As the thrust bearing is generally a "weak link" in the turbocharger, there is a need in the art to replace the thrust bearing with a new, stronger device. Such a device is disclosed herein.

Another common area of failure in a turbocharger is the journal bearings. Excessive heat, speed, lack of lubrication can cause these journal bearings to fail, which is quite common.

SUMMARY

The present embodiments include a bearing sleeve that is designed to replace the thrust bearing that is used in a turbocharging device (e.g., either a turbocharger or a supercharger). The bearing sleeve (which may be referred to herein as a "sleeve" or as a "ball bearing sleeve") includes ball bearings that are designed to dissipate and/or correct for loads that are applied in the z direction. The ball bearings in the sleeve may also dissipate and/or correct for loads that are applied in the x and y directions as well. In some embodiments, the sleeve will include a first set of ball bearings positioned proximate the proximal end of the sleeve and a second set of ball bearings positioned proximate the distal end of the sleeve. One or more of these sets of ball bearings may be pre-loaded (using a spring or other similar device).

The sleeve bearing may include a cylindrical portion and a top portion. The cylindrical portion may include one or more grooves for directing the flow of oil. An oil duct with one or more access holes may be added to the cylindrical portion to allow the oil flow to access the grooves. The underside of the ball bearing sleeve may include an oil drip that allows the oil to exit the sleeve so that it may be re-circulated.

In some embodiments, the ball bearings used within the sleeve may be angular contact ball bearings. In other embodiments, the ball bearings may be constructed of steel, nylon, ceramic or another similar materials.

DETAILED DESCRIPTION

Figure 1:
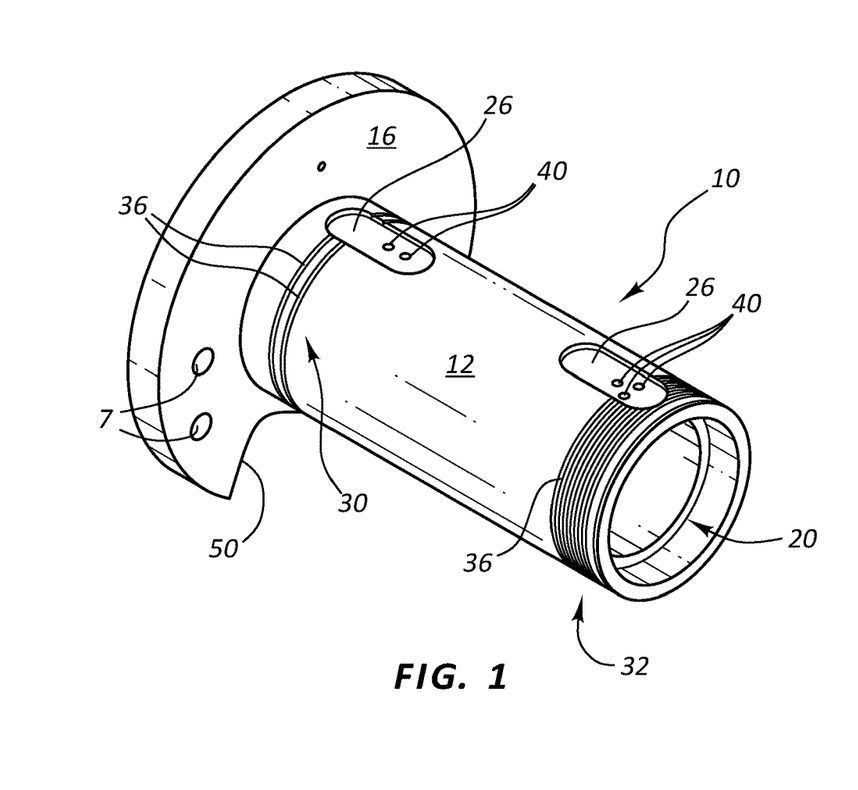
FIG. 1 is a perspective view of a sleeve bearing according to the present embodiment.

The present embodiments relate to a new type bearing system that will surround the shaft of a turbocharger device. Specifically, FIG. 1 shows a perspective view of a sleeve 10 that will surround a shaft (not shown in FIG. 1) of a turbocharging device. The sleeve 10 is generally made of metal, such as steel, aluminum, titanium, etc. or alloys thereof. The sleeve 10 is designed to replace the thrust bearing and journal bearings of a turbocharging device. As described herein, the sleeve 10 will form part of a sleeve assembly 21. In other words, the sleeve 10, along with ball bearings not shown in FIG. 1) and a spring (not shown in FIG. 1) operate to form the sleeve assembly 21.

Specifically, the sleeve 10 comprises a cylindrical portion 12 and a top portion 16. Both the cylindrical portion 12 and the top portion 16 have an aperture 20. The shaft is designed to pass through the aperture 20. As shown in FIG. 1, the cylindrical portion 12 may include one or more oil ducts 26. The oil ducts 26 are indentations within the cylindrical portion 12 that are designed to receive the engine oil. One of the purposes of the ducts 26 is to allow the oil to easily access the front and back portions of the sleeve 10 (for lubrication and cooling purposes). In the embodiment shown in FIG. 1, there are two (2) oil ducts 26 that are positioned on the cylindrical portion 12—one duct 26 positioned at or near the proximal end 30 and another duct 26 positioned at or near the on the distal end 32 of the sleeve 10. Of course, those skilled in the art will appreciate that more or less than two (2) oil ducts 26 may be used as desired.

One or more cooling grooves 36 may also be positioned on the sleeve 10. The purpose of the cooling grooves 36 is to direct the oil flow. More specifically, the cooling grooves 36 are channels that allow the engine oil to surround the sleeve 10 and cool the sleeve, bearings, shaft, etc. These grooves 36 facilitate the flow of the oil. Further, one or more access holes 40 may also be added to each duct 26. Ducts 26 are designed to allow oil to flow to holes 40, and, into the grooves 36. By constructing the holes 40/grooves 36 in this manner, the flow of the oil may be controlled and thus lubricate ball bearings the shaft (not shown), etc., and the oil may readily cool the sleeve 10, the shaft, and other portions of the turbocharger.

Figure 2A:
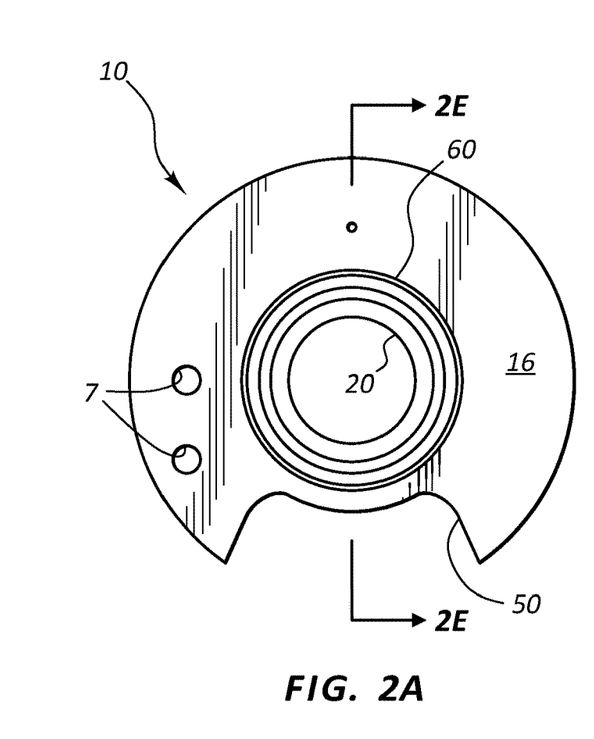
FIG. 2A is a side view of the sleeve bearing of FIG. 1.
Figure 2B:
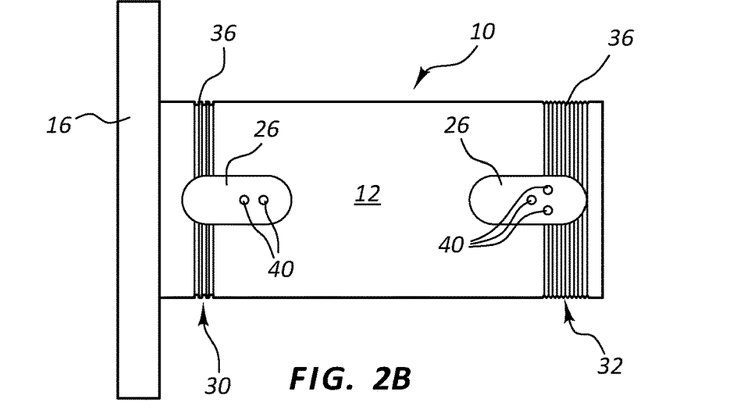
FIG. 2B is a top view of the sleeve bearing of FIG. 1.
Figure 2C:
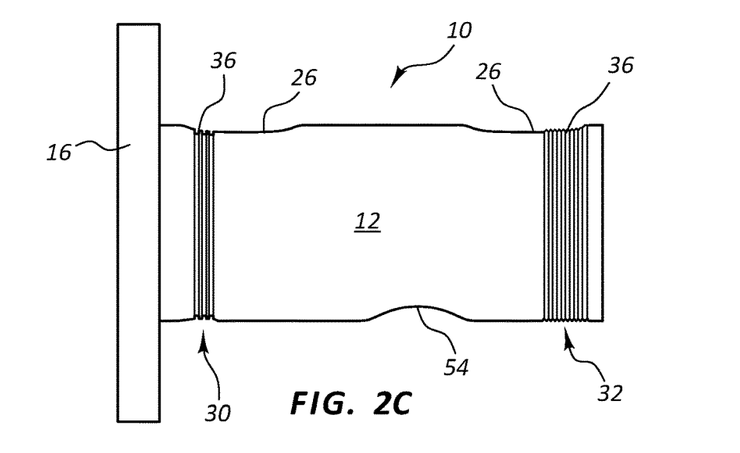
FIG. 2C is an elevation view of the sleeve bearing of FIG. 1.
Figure 2D:
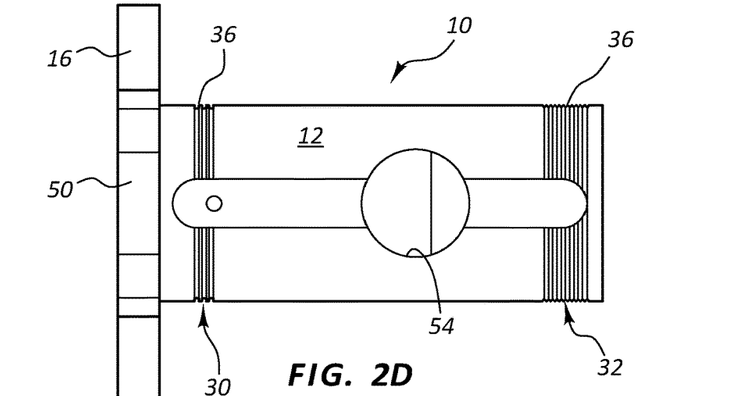
FIG. 2D is a bottom view of the sleeve bearing of FIG. 1.

FIGS. 2A-2D are plan views of the sleeve 10 that show other features of the sleeve 10. For example, as shown in FIG. 2A, the top portion 13 may include a cutout portion 50 positioned proximate the bottom of the sleeve 10. Further, the cylindrical portion 12 may include an oil drain 54. The oil drain 54 may be positioned on the bottom of the cylindrical portion 12. The purpose of the oil drain 54 and the cutout portion 50 is to provide an opening/feature whereby the oil that lubricates/cools the sleeve 10 may drain out of the sleeve, into other portions of the engine (e.g., for re-circulation).

In some embodiments, there may be one or more indentations 60 on the top portion 16. These indentations 60 may be concentric with the aperture 20. In the embodiment of FIG. 2A, two indentations 60 are shown, but a different amount of indentations may also be used (if the indentations are used at all).

Figure 2E:
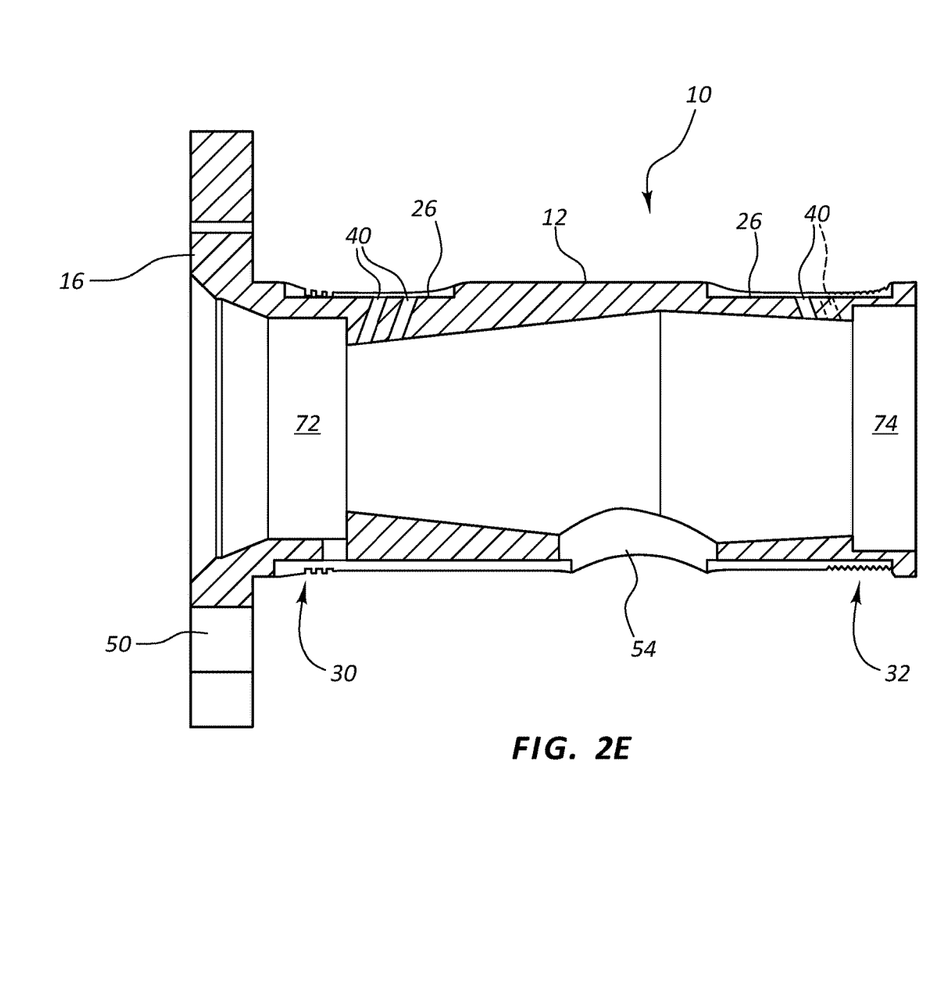
FIG. 2E is a partially cutaway, cross-sectional view of the sleeve bearing of FIG. 1.

FIG. 2E is a cross-sectional view of the sleeve 10. The sleeve 10 is designed such that it may include one or more ball bearings 70 (shown in FIG. 3.) The one or more ball bearings 70 may be placed within a housing 72. In the embodiment shown in FIG. 2E, there is a first housing 72 that houses one or more ball bearings 70 positioned at the proximal end 30. A second housing 74 may also be positioned at the distal end 32 and houses a second quantity of ball bearings 70. The exact number of ball bearings 70 will depend upon the size of the housings 72, 74, the particular embodiment, the size of the balls, etc. Those skilled in the art will appreciate that more or less than two housings 74, 74 may also be used. In some embodiments, the housings 72, 74 may comprise a surface on which the ball bearings 70 may engage/roll. In other embodiments, other types of bearings may be used (such as nylon bearings, washers, etc.) and these bearings may interact with/engage the housings 72, 74 in other ways.

The purpose of the ball bearing(s) 70 is to control the motion of the shaft 120 when it is installed into a turbocharging device. More specifically, the ball bearings 70 can compensate for and/or absorb motion in all three directions (e.g., in the x, y, and z directions), and do so in a manner which causes much less friction than journal and thrust bearings. This ability to compensate for and/or absorb motion may be particularly important in that it allows the sleeve 10 to control forward and/or rearward thrust caused by the boost pressure. More specifically, as the turbine wheel in the turbocharging device spins, a pressure is exerted on the back side (the non-airfoil side) of the compressor wheel, causing a forward (axial) thrust. Further, the compressor wheel acts like an airplane propeller and tries to climb forward through the air, thereby increasing this "axial thrust." Moreover, in the event of surge (where the compressor wheel changes direction of spinning due to air going backwards through the intake), the thrust load will be violently changed back and forth, also causing huge thrust loads. However, by using the ball bearings 70 in the sleeve 10, the ball bearings 70 can rotate, spin, etc. as a means of absorbing/dissipating these thrusts loads/movements. Normally, when these axial thrusts are applied to a thrust bearing, the thrusts ultimately cause the thrust bearing to fail. However, by the use of these ball bearings 70, the axial thrust motion can be compensated for such that the sleeve 10 and ball bearings 70 have a much lower failure rate. In fact, the sleeve 10 can replace the thrust bearing such that this "weak link" (e.g., the thrust bearing) is no longer a part of the turbocharger system. Thus, the present embodiments provide a better turbocharging device that is less likely to fail based upon axial thrust, that will build boost quicker, as well as having less overall friction making the overall device more efficient. Ball bearings also require less oil to lubricate them. It should be noted that while ball bearing turbochargers are not new, ball bearing sleeve 10 allows a means of retrofitting existing journal and thrust bearing turbochargers with much more efficient ball bearings.

Obviously, the exact number of ball bearings 70 will depend, in part, upon the type/amount of the axial thrust loads. In other words, the ball bearings 70 need to be of sufficient size and number such that it can withstand the axial thrust loads that will be applied thereon. In some embodiments, ceramic ball bearings may be used as the ball bearings 70. In other embodiments, steel ball bearings (or other metallic ball bearings) may be used. Further, in some embodiments, the ball bearings 70 may be "angular contact" ball bearings. Angular contact ball bearings are commercially available from a variety of different suppliers and may be made from a variety of different materials. Again, the particular embodiment and the particular type/amount of axial thrust loads will help to determine the selection of the particular type of ball bearing.

Figure 3:
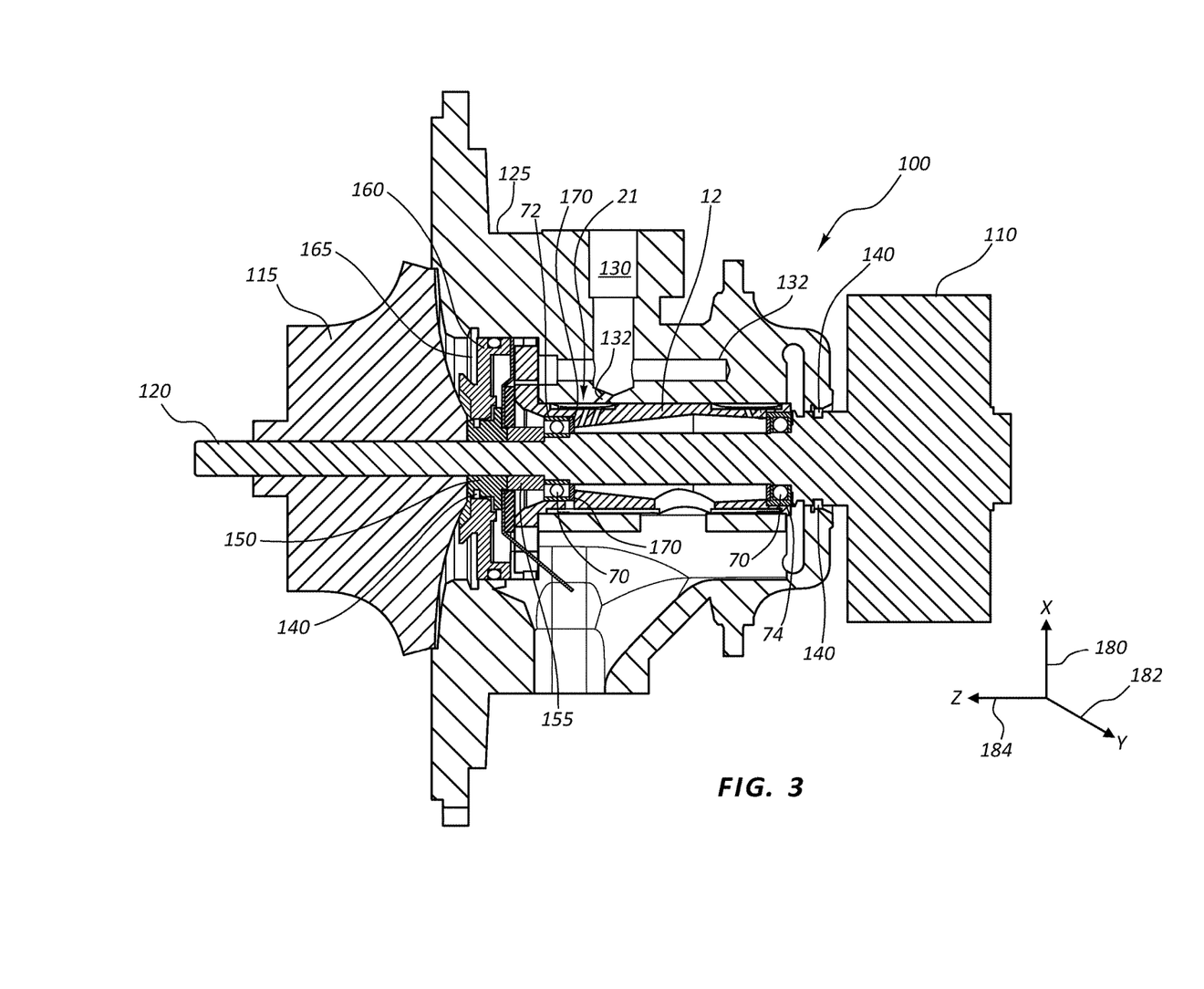
FIG. 3 is a cross-sectional view of the sleeve bearing that is shown mounted within a turbocharging device.

Referring now to FIG. 3, the sleeve 10 along with the ball bearing, including ball bearings 70, and spring 170 form the sleeve assembly 21. The sleeve assembly 21 is shown being added to a turbocharging device 100. Specifically, the turbocharging device 100 includes a turbine wheel 110 that is capable of spinning. More specifically, the turbine wheel 110 includes blades (not shown) that are capable of spinning based upon the exhaust gases that are produced by the engine. As turbine wheels 110 are common in the turbocharging industry, those skilled in the art would appreciate how to construct this feature.

Further, the turbocharging device 100 also includes a shaft 120 that connects the turbine wheel 110 to an air compressor 115. As known in the art, when the turbine wheel 110 spins, the shaft 120 will take this rotational motion and will transfer it to the air compressor 115. In turn, this air compressor 115 will compress air that may then be added to the pistons/cylinders of the engine to produce the turbocharging effect. (Of course, an intercooler or other known devices may also be used in conjunction with the air compressor 115, as known in the art.)

As shown in FIG. 3, the housing 125 has been bored out to allow the sleeve 10 to be placed within the housing 125. The sleeve 10 surrounds the shaft 120. In other words, the shaft 120 passes through the aperture 20 in the sleeve 10.

The housing 125 may include an oil port 130 along with one or more distribution tubes 132 which are designed to funnel the oil into the oil ducts 26 (and/or to other portions of the sleeve 10.) As noted above, once the oil reaches the ducts 26, it can flow through holes 40 and grooves 36 to lubricate the ball bearings 70, and cool sleeve 10. The oil may then pass through the oil drain 54 and be collected and re-circulated.

Between the turbine wheel 110 and the housing 125 may be one or more oil seals 140. The purpose of the oil seal 140 is to prevent the oil (that is used to lubricate the system) from accessing and/or escaping out through the turbine wheel 110. The seal 140 may comprise an O-ring or another similar sealing feature. Similarly, between the compressor 115 and the top portion 16 may be another seal 145 that may be held in its proper position by a seal retainer 150.

In addition to the shaft 120, a spacer 155 may be positioned within the aperture 20 at the proximal end 32. This spacer 155 may be designed to allow the shaft 120 to have sufficient space (room) such that it may rotate. Further, a front retainer 160 and a retainer ring 165 may be added proximate the proximal end 32 in order to secure the sleeve 10 in the proper position. Of course, these features are exemplary. Other structures, features or devices that operate to restrain the sleeve in the proper position may also be used, such as a pin device which goes from the turbocharger housing 125 into the sleeve 10 on the flange portion, in hole 7 to keep the sleeve 10 from spinning inside the turbo housing 125.

The operation of the ball bearings 70 will now be described. As noted above, the ball bearings 70 may be housed within bore 72, 74. With respect to housing 72, a spring 170 may be positioned adjacent the housing 72 and/or the ball bearings 70, thereby placing a pre-load on these bearings. The purpose of the load imposed by the spring 170 is to help the bearings 70 to stay in contact with the inner and outer race to keep balls from losing contact with the race, at high speeds, and to allow higher speeds than would be otherwise possible without the pre-load.

As shown in FIG. 3, the x, y, and z-directions are illustrated. Reference numeral 180 refers to the defined "x-direction." Reference numeral 182 refers to the defined "y-direction." Reference numeral 184 refers to the defined "z-direction." The z-direction 184 is parallel with an axial dimension of the cylindrical portion 12 of the sleeve 10, while the x-direction 180 and y-direction 182 are parallel to radial dimensions of the cylindrical portion 12 of the sleeve 10. The axial dimension of the cylindrical portion 12 of the sleeve 10 extends along the length of the cylindrical portion 12. The radial dimensions of the cylindrical portion 12 are perpendicular to the axial dimension of the cylindrical portion 12. The axial loads created by compressor 115 are applied in the z-direction 184. More specifically, as the boost pressure develops, the pressure is exerted on the back side (the non-airfoil side) of the compressor 115, causing a forward (axial) thrust in the z-direction 184. Further, the compressor 115 acts like an airplane propeller and tries to climb forward through the air, which increases the axial thrust in the z-direction 184. The fact that the ball bearings 70 are loaded by spring 170 means that the ball bearings 70 can rotate and absorb/dissipate these pressures in the z-direction. Further, in the event of surge (e.g., a situation where the compressor wheel changes direction of spinning due to air going backwards through the intake), the thrust load will be violently changed back and forth in the z-direction 184 also causing huge thrust loads. However, the bearings 70 can absorb the thrust load(s) and thus dissipate the load(s). Thus, by using the present bearings 70, the thrust loads can be dealt with and will not cause the sleeve 10 to fail (as is common with conventional thrust bearings). For this reason, the present embodiments represent an improvement over thrust and journal bearing/bushing turbocharger devices.

At the same time, the present ball bearings 70 may also, by their spherical nature, absorb and/or dissipate any loads that are imposed on the sleeve in either the x-direction 180 or the y-direction 182. In other words, if a load is placed in either the x-direction 180 or the y-direction 182 (or has a vectoral component in either the x or y-direction), the ball bearings 70 can simply spin in a direction that dissipates these loads. Likewise, if a load has a directional component in the z-axis, the ball bearings 70 can spin to dissipate this load as well. Thus, the ball bearings 70 can absorb/dissipate all of the loads that are imposed upon the sleeve 10.

Because the present sleeve assembly 21 controls motion in the x, y and z directions, there is no need for additional bearings to control movements in these directions. As noted herein, conventional turbocharging systems use a thrust bearing to control the motion/loads in the z-direction. The present sleeve assembly 21 may be used in place of a thrust bearing such that no thrust bearing is used/required in the present system. Further, conventional turbocharging systems may also have two (2) journal bearings that are used to control the motion/loads in the x and y directions. These journal bearings may also be replaced via the present sleeve 10. However, other than the thrust bearing and these two journal bearings, the present sleeve 10 may be used with the other standard components, such as the oil seals, collars, compressor wheel, turbine wheel/shaft, oil slingers (including other journal bearings, etc.) that are used in standard turbocharging systems. In other words, the present sleeve 10 is designed for use with most, if not all, existing journal bearing style turbocharging systems. The present sleeve assembly 21 may be used also to retrofit turbocharging devices that use to a combination of a ball bearing and a journal bearing which are known in the industry.

In some embodiments, it may be necessary to bore out some of the housing in order to fit the sleeve 10 into the system; however, other than this modification, the present sleeve 10 is very adaptable and may be used with a variety of different systems. In some embodiments, the present sleeve 10 may be used with BorgWarner brand turbocharging systems, which are turbochargers that are typically not used with ball bearing in the system. Thus, the present embodiments can be adapted to work with systems that do not normally use ball bearings. In some of these embodiments, the thickness of the sleeve 10 may be the same as the thickness of a conventional thrust bearing, thereby allowing the present sleeve 10 to be retro-fit (with or without hollowing out a portion of the housing) onto existing turbocharging systems.

The above-recited embodiments have been described and shown with respect to a "turbocharger" that provides additional airflow to the engine by utilizing the flow of exhaust gases from the engine. However, the present embodiments may also be used in conjunction with a "supercharger" that provides additional airflow to the engine by mechanically utilizing power tapped from the engine via a pulley or some other similar device. In other words, a sleeve 10 according to the present embodiments may be used to replace a thrust bearing (and/or journal bearings) in a system that has a "supercharger" rather than a "turbocharger." In order to encompass both of these embodiments, the present sleeve 10 may be used with a "turbocharging device, which means that the sleeve 10 may be used with both "superchargers" and "turbochargers."

Additional embodiments may also be constructed in which multiple sleeves 10 are used in the same turbocharging device. For example, a first sleeve may be used proximate the air compressor while a second sleeve may be positioned proximate the turbine wheel. Additional embodiments may be designed in which more than two (2) sleeves are used together. Those skilled in the art will appreciate how more than one sleeve 10 may be configured to work together to address the loads in the x, y, and/or z directions.

What is claimed is:
1. A turbocharger sleeve assembly comprising:
a turbocharger housing;
a unitary, one-piece ball bearing sleeve disposed within and non-rotatably engaged with the turbocharger housing, the sleeve comprising:
a cylindrical portion comprising a distal end, a proximal end, and an axial dimension extending along a length of the cylindrical portion, and a radial dimension perpendicular to the axial dimension;
a flange portion abutting the proximal end of the cylindrical portion, wherein the flange portion engages the turbocharger housing to limit movement of the sleeve along the axial dimension;
a first set of ball bearings disposed radially inward of the sleeve; and
a first set of one or more grooves disposed on an exterior surface of the cylindrical portion, the first set of one or more grooves overlapping with the first set of ball bearings along the axial dimension and outwardly disposed about the first set of ball bearings along the radial dimension, wherein each of the grooves in the first set of one or more grooves is annular in shape.

2. The turbocharger sleeve assembly of claim 1, further comprising:
a second set of ball bearings disposed radially inward of the sleeve, the second set of ball bearings being offset from the first set of ball bearings along the axial dimension; and
a second set of one or more grooves on the exterior surface of the cylindrical portion, the second set of one or more grooves overlapping with the second set of ball bearings along the axial dimension and outwardly disposed about the second set of ball bearings along the radial dimension, wherein each of the grooves in the second set of one or more grooves is annular in shape.

3. The turbocharger sleeve assembly of claim 2, the first set of ball bearings being positioned at the distal end of the cylindrical portion and the second set of ball bearings being positioned at the proximal end of the cylindrical portion.

4. The turbocharger sleeve assembly of claim 3, wherein the turbocharger housing defines a set of distribution tubes and one or more access holes, wherein the set of distribution tubes and the one or more access holes are in fluid communication with at least one of:
the first set of one or more grooves,
the second set of one or more grooves,
the first set of ball bearings and
the second set of ball bearings.

5. The turbocharger sleeve assembly of claim 2, wherein at least one of the first set of ball bearings and the second set of ball bearings are positioned relative to the sleeve to control loads applied to the sleeve in the axial dimension.

6. The turbocharger sleeve assembly of claim 5, wherein at least one of the first set of ball bearings and the second set of ball bearings are positioned relative to the sleeve to control loads applied to the sleeve in the radial dimension.

7. The turbocharger sleeve assembly of claim 2, further a spring that biases at least one of the first set of ball bearings and the second set of ball bearings along the axial dimension.

8. The turbocharger sleeve assembly of claim 2, wherein at least one of the first set of ball bearings and the second set of ball bearings comprise angular contact ball bearings that are constructed of ceramic or steel.

9. The turbocharger sleeve assembly of claim 1, wherein the turbocharger housing defines an oil drain.

10. A turbocharger sleeve assembly comprising:
a turbocharger housing;

a unitary, one-piece ball bearing sleeve disposed within with the turbocharger housing, the sleeve having a hole for receiving a pin or rod to prevent the sleeve from rotating with respect to the turbocharger housing, the sleeve comprising:
  a cylindrical portion comprising a distal end, a proximal end, and an axial dimension extending along a length of the cylindrical portion, and a radial dimension perpendicular to the axial dimension;
  a flange portion abutting the proximal end of the cylindrical portion, wherein the flange portion engages the turbocharger housing to limit movement of the sleeve along the axial dimension;
a first set of ball bearings disposed radially inward of the sleeve; and
a first set of one or more grooves disposed on an exterior surface of the cylindrical portion, the first set of one or more grooves overlapping with the first set of ball bearings along the axial dimension and outwardly disposed about the first set of ball bearings along the radial dimension, wherein each of the grooves in the first set of one or more grooves is annular in shape.

11. The turbocharger sleeve assembly of claim 10, further comprising an oil drain disposed in the cylindrical portion.

12. The turbocharger sleeve assembly of claim 11 such, wherein the oil drain is offset from the first set of ball bearings along the axial dimension.

13. A turbocharger sleeve assembly comprising:
a turbocharger housing;
a unitary, one-piece bearing sleeve disposed within and non-rotatably engaged with the turbocharger housing, the sleeve comprising:
  a cylindrical portion comprising a distal end, a proximal end, and an axial dimension extending along a length of the cylindrical portion, and a radial dimension perpendicular to the axial dimension, the cylindrical portion comprising an oil drain, the oil drain comprising an opening that is positioned on a bottom of the cylindrical portion when installed for use with an engine;
  a flange portion abutting the proximal end of the cylindrical portion, wherein the flange portion engages the turbocharger housing to limit movement of the sleeve along the axial dimension; and
a first set of bearings disposed radially inward of the sleeve.

14. The turbocharger sleeve assembly of claim 13, wherein a first set of one or more grooves disposed on an exterior surface of the cylindrical portion, the first set of one or more grooves overlapping with the first set of bearings along the axial dimension and outwardly disposed about the first set of bearings along the radial dimension, wherein each of the grooves in the first set of one or more grooves is annular in shape.

15. The turbocharger sleeve assembly of claim 13, further comprising a shaft that connects an air compressor to a turbine wheel, wherein the shaft is disposed radially inward with respect to the first set of bearings, the first set of bearings enabling rotation of the shaft with respect to the sleeve.

16. The turbocharger sleeve assembly of claim 15, wherein both axial and radial motion of the shaft are restricted while concurrent rotation of the shaft, air compressor and turbine wheel is enabled such that exhaust energy captured by the turbine wheel is transferred through the shaft to the air compressor.

* * * * *